US008549291B2

(12) United States Patent
Choi et al.

(10) Patent No.: US 8,549,291 B2
(45) Date of Patent: Oct. 1, 2013

(54) WIRELESS NETWORK APPARATUS STORING AUTHENTICATION INFORMATION IN MULTIPLE FORMATS AND AREAS AND AUTHENTICATION METHOD OF THE SAME

(75) Inventors: Jin-hyeon Choi, Seoul (KR); Sang-hyun Shin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1497 days.

(21) Appl. No.: 11/472,354

(22) Filed: Jun. 22, 2006

(65) Prior Publication Data

US 2007/0026843 A1    Feb. 1, 2007

(30) Foreign Application Priority Data

Jul. 28, 2005   (KR) ................. 10-2005-0069004

(51) Int. Cl.
*H04L 9/32* (2006.01)
*H04K 1/00* (2006.01)
*H04M 1/66* (2006.01)

(52) U.S. Cl.
USPC .......... 713/168; 380/247; 455/410; 455/411; 726/4

(58) Field of Classification Search
USPC ................. 713/165, 168–181; 455/411, 410; 380/247, 229, 232; 726/4, 19, 21
See application file for complete search history.

(56) References Cited

U.S. PATENT DOCUMENTS

| | | | |
|---|---|---|---|
| 5,345,507 A | 9/1994 | Herzberg et al. | |
| 5,412,728 A | 5/1995 | Besnard et al. | |
| 5,495,533 A | 2/1996 | Linehan et al. | |
| 5,650,859 A * | 7/1997 | Koizumi | 358/404 |
| 5,757,924 A * | 5/1998 | Friedman et al. | 713/151 |
| 6,105,027 A * | 8/2000 | Schneider et al. | 707/9 |
| 6,741,852 B1* | 5/2004 | Mohrs | 455/411 |
| 7,039,021 B1* | 5/2006 | Kokudo | 370/310 |
| 7,315,950 B1* | 1/2008 | Baransky et al. | 713/193 |
| 7,330,486 B2* | 2/2008 | Ko et al. | 370/475 |
| 7,421,243 B2* | 9/2008 | Sato et al. | 455/3.01 |
| 2001/0005682 A1* | 6/2001 | Terao et al. | 455/550 |
| 2004/0039924 A1* | 2/2004 | Baldwin et al. | 713/189 |
| 2004/0068631 A1* | 4/2004 | Ukeda et al. | 711/163 |

(Continued)

FOREIGN PATENT DOCUMENTS

| | | |
|---|---|---|
| JP | 7-297819 | 11/1995 |
| JP | 2003-318939 | 11/2003 |

(Continued)

OTHER PUBLICATIONS

Notice of Allowance issued on May 29, 2007 by the Korean Intellectual Property Office for Korean Patent Application No. 2005-69004.

(Continued)

*Primary Examiner* — Allahyar Kasraian
(74) *Attorney, Agent, or Firm* — Staas & Halsey LLP (57) ABSTRACT

A wireless network apparatus including an authentication information storage unit to store first authentication information for network communication, an authentication information converting unit to generate second authentication information by converting the stored first authentication information according to an predetermined authentication method, a nonvolatile storage unit to store the generated second authentication information, and an authentication processing unit to conduct an authentication based on the second authentication information.

20 Claims, 4 Drawing Sheets

(56) References Cited

U.S. PATENT DOCUMENTS

| | | |
|---|---|---|
| 2004/0073846 A1* | 4/2004 | Nakanishi et al. .............. 714/42 |
| 2004/0121772 A1 | 6/2004 | Rue |
| 2005/0009521 A1* | 1/2005 | Preece ....................... 455/435.1 |
| 2005/0037671 A1* | 2/2005 | Yamada et al. ............... 439/677 |
| 2005/0216738 A1* | 9/2005 | Kita et al. .................... 713/168 |
| 2006/0007886 A1* | 1/2006 | Lee et al. ...................... 370/329 |
| 2006/0020786 A1* | 1/2006 | Helms et al. ................. 713/165 |
| 2006/0026431 A1* | 2/2006 | Campello De Souza ..... 713/176 |
| 2006/0045272 A1* | 3/2006 | Ohaka .......................... 380/270 |
| 2006/0148402 A1* | 7/2006 | Hagiwara ................... 455/41.1 |

FOREIGN PATENT DOCUMENTS

| | | |
|---|---|---|
| JP | 2004-15725 | 1/2004 |
| JP | 2004-304240 | 10/2004 |
| KR | 2004-4925 | 1/2004 |
| KR | 2004-47352 A | 6/2004 |
| KR | 2004-53992 | 6/2004 |
| KR | 2005-94303 | 9/2005 |
| WO | WO 92/22159 | 12/1992 |
| WO | WO 00/76118 A1 | 12/2000 |

OTHER PUBLICATIONS

Notice of Examination Report issued in Korean Patent Application No. 2005-69004 on Aug. 31, 2006.

* cited by examiner

PRIOR ART

FIG. 1

PRIOR ART

WIRELESS NETWORK APPARATUS STORING AUTHENTICATION INFORMATION IN MULTIPLE FORMATS AND AREAS AND AUTHENTICATION METHOD OF THE SAME

CROSS-REFERENCE TO RELATED APPLICATION

This application claims the benefit of Korean Application No. 2005-69004, filed Jul. 28, 2005, in the Korean Intellectual Property Office, the disclosure of which is incorporated herein by reference.

BACKGROUND OF THE INVENTION

1. Field of the Invention

An aspect of the present invention relates to a wireless network apparatus and an authentication method of the same, and more particularly, to a wireless network apparatus and an authentication method that reduces power consumption when authentication is conducted.

2. Description of the Related Art

With the development of communication and network technologies, network environments have shifted from wired networks, such as coaxial-cable or optical-cable networks, to the wireless networks using signals of different frequency bands. Accordingly, wireless terminals (hereinafter, referred to as "wireless network apparatuses") each comprising a wireless interface for wireless communications, and processing a variety of information to thereby conduct a special function, have been developed. To comply with this development, wireless network technologies have appeared to enable these wireless network apparatuses to efficiently communicate with each other via wireless networks.

Currently, there are two types of existing wireless networks: an infrastructure mode wireless network and an ad-hoc mode wireless network.

Figure 1:
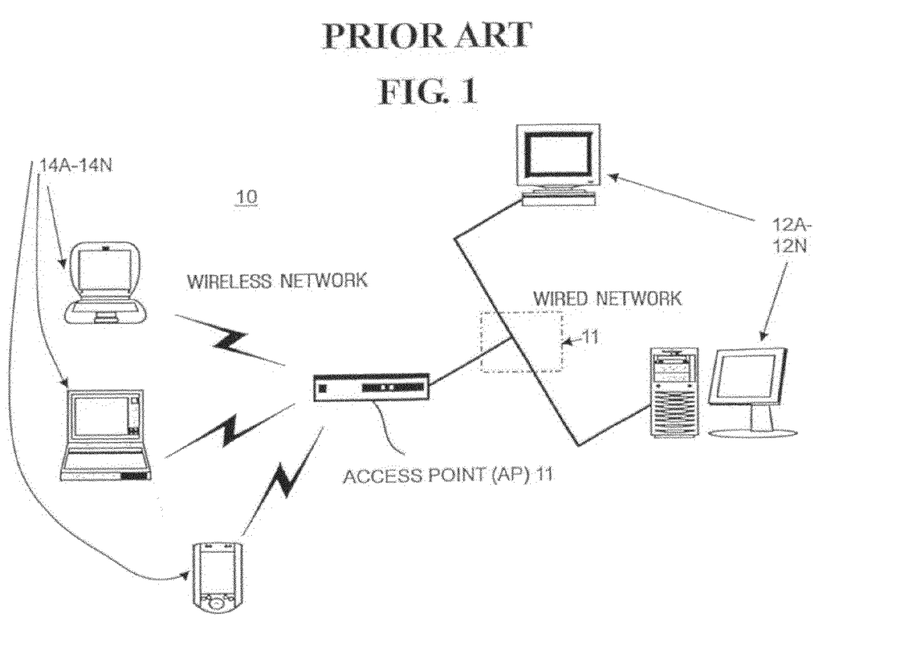
FIG. 1 illustrates an existing wireless network in an Infrastructure mode.
Figure 2:
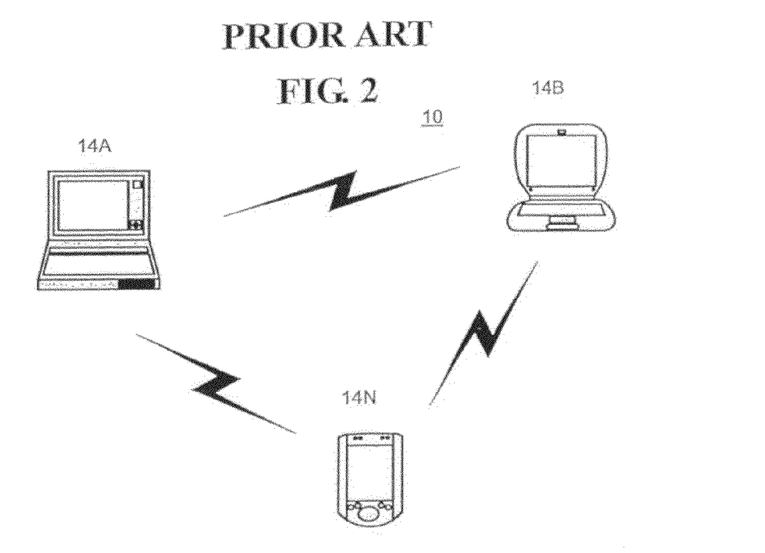
FIG. 2 illustrates an existing wireless network in an Ad-hoc mode.

FIG. 1 illustrates an infrastructure mode wireless network. FIG. 2 illustrates an ad-hoc mode wireless network. As shown in FIG. 1, an existing wireless network 10, operable in an infrastructure mode typically includes a distribution system 11, which serves as a backbone Ethernet-based network that supports servers 12A-12N and one or more bridges or routers (not shown) to link with other networks, including, for example, the Internet, and one or more control modules, known as wireless Access Points (APs) 13 arranged at a designated location in the wireless network, each supporting wireless communication with a number of wireless terminals, also known as "wireless network apparatuses" 14A-14N within its transmission range and providing access to the distribution system 11. The wireless AP 13 is provided to access network resources, via the distribution system 11 such as the Internet, while the wireless network apparatuses 14A-14N are provided to communicate with the wireless AP 130, via wireless links, as specified by standard communication protocols, such as, for example, IEEE 802.11(a), (b) and/or (g) standards for a wireless LAN. Each of the wireless AP 13 and the wireless network apparatuses 14A-14N is also equipped with a wireless interface provided to perform all functions necessary to transmit and receive information in accordance with IEEE 802.11(a), (b) and/or (g) standards for a wireless LAN. Wireless network apparatuses 14A-14N can share information and access each other in an authenticated manner, via the wireless AP 13. The wireless AP 13 can, in turn, authenticate conforming wireless terminals 14A-14N with the authorized information transmitted, via wireless links.

In the ad-hoc mode wireless network, data may be transceived directly between the wireless network apparatuses 14A-14N that belong to a single wireless network, without the need of an Access Point (AP) 11. There is no infrastructure or structure to the wireless network. Usually, one or more network apparatuses 14A-14N can exchange bi-directional traffic.

In the case of the infrastructure mode wireless network, an access point (AP) 11 is provided to authenticate a wireless network apparatus that desires to become part of the wireless network. As an example, the authentication may be made based on the Media Access Control (MAC) address allocated to the wireless network apparatus. The MAC address is a hardware address used to identify each of the wireless network apparatuses, which is applied to an Ethernet-based network and set when the concerned wireless network apparatus is manufactured.

However, the authentication based on the MAC address of the wireless network apparatus is only possible when the wireless network apparatus is powered on. As a result, this increased the power consumption of the wireless network apparatus.

Korean Unexamined Patent Publication No. 10-2004-0053992 discloses a method for supporting the mobility of a wireless Local Area network (LAN) terminal in order to ensure that the wireless LAN terminal may move from one access point to another access point when an Integrated Services Digital Network (ISDN) data line is used as a communication line between a switching system and several access points. However, the invention is directed to maintaining a uniform quality of sound when a wireless LAN terminal moves from a basic service set of one access point to a basic service set of another service set. As such, there is a need for a method to reduce the power consumption of a wireless LAN terminal.

SUMMARY OF THE INVENTION

An aspect of the present invention is to provide a wireless network apparatus and an authentication method of the same that reduces power consumption, by storing authentication information of a wireless network apparatus in a nonvolatile storage medium.

These and/or other aspects, features and advantages of the present invention will become apparent to those skilled in the art from the following disclosure.

According to an aspect of the present invention, there is provided a wireless network apparatus including an authentication information storage unit to store first authentication information for network communication, an authentication information converting unit to generate second authentication information by converting the stored first authentication information according to an predetermined authentication method, a nonvolatile storage unit to store the generated second authentication information, and an authentication processing unit to conduct an authentication based on the second authentication information.

According to another aspect of the present invention, there is provided an authentication method of a wireless network apparatus including generating second authentication information for network communication by converting the first authentication information according to a predetermined authentication method, storing the generated second authentication information in nonvolatile storage medium, and conducting an authentication based on the second authentication information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
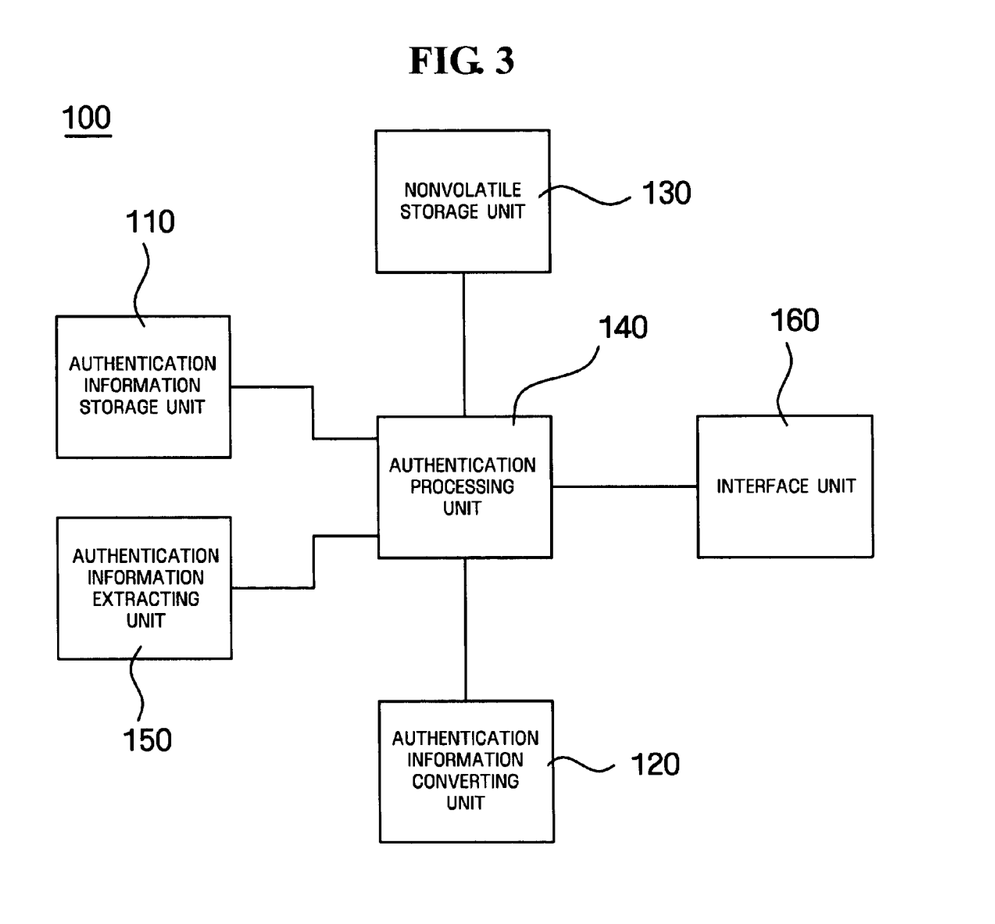
FIG. 3 illustrates a wireless network apparatus according to an exemplary embodiment of the present invention.

FIG. 3 illustrates a wireless network apparatus according to an exemplary embodiment of the present invention. As shown in FIG. 3, the wireless network apparatus 100 may include an authentication information storage unit 110 to store first authentication information for network communication, an authentication information converting unit 120 to generate second authentication information by converting the stored first authentication information according to a predetermined authentication method, a nonvolatile storage unit 130 to store the generated second authentication information, and an authentication processing unit 140 to conduct an authentication based on the second authentication information.

Also, the wireless network apparatus 100 further includes an authentication information extracting unit 150 to extract at a user's request the first authentication information stored in the authentication information storage unit 110, a nonvolatile storage unit 130, and an interface unit 160 to communicate with an external device.

It is assumed in the exemplary embodiment of the present invention that MAC address is allocated to each wireless network apparatus when it is manufactured as authentication information stored in the authentication information storage unit 110. It is possible that authentication information is stored in the authentication information storage unit 110 according to an authentication method. A Media Access Control (MAC) address is composed of 6 bytes (48 bits), and the first 3 bytes are managed by IEEE, and the last 3 bytes are managed by the manufacturer of a wireless network apparatus.

The authentication information converting unit 120 may convert first authentication information stored in the authentication information storage unit 110 according to the authentication method used when the wireless network apparatus 100 conducts an authentication for network communication.

Where a user conducts the authentication of the wireless network apparatus 100, the user may request first authentication information stored in the authentication information storage unit 110 via the authentication information request unit 150. At this time, at a request of a user, a predetermined application may extract first authentication information stored in the authentication information storage unit 110. The authentication information converting unit 120 may convert the first authentication information according to an authentication method of the wireless network apparatus 100.

In case of digital multimedia management, a MAC address uses 128 bits for the authentication. Accordingly, the authentication information converting unit 120 converts a 48 bit MAC address to 128 bits by adding a predetermined series of bits to the first authentication information stored in the authentication information storage unit 110.

It is assumed that the authentication information converting unit 120 may add a predetermined string to the first authentication information stored in the authentication information storage unit 110. When the authentication of the wireless network apparatus 100 is conducted, the conversion of the first authentication information by the authentication information converting unit 120 may be omitted if authentication is possible through the first authentication information.

The nonvolatile storage unit 130 is a nonvolatile memory cell that electrically writes or erases data, and stores the second authentication information generated in the authentication information converting unit 120 even when the power of the wireless network apparatus 100 off. The nonvolatile storage unit is used because the nonvolatile storage unit 130 consumes less power than a magnetic disk storage medium, and has fast access times like a magnetic storage unit.

Also, the nonvolatile storage unit 130 stores the second authentication information generated by the authentication information converting unit 120. The authentication of the wireless network apparatus 100 may be made based on the first authentication information stored in the authentication information storage unit 110; however, the nonvolatile storage unit 130 may store the first authentication information. Accordingly, the first authentication information and the second authentication information may be similar information or different.

At this time, the second authentication information may be stored in a secure area that the nonvolatile storage unit 130 selectively allows external access to, for example, a tamper resistant module (TRM), but the present invention is not limited to this. Accordingly, the second authentication information is protected from physical tampering.

The authentication processing unit 140 may conduct the authentication of the wireless network apparatus 100 based on the second authentication information stored in the nonvolatile storage unit 130. For example, when the wireless network apparatus 100 powers on, a kernel may store the second authentication information in a global variable by reading the second authentication information from the nonvolatile storage unit 130. The application may call an application programming interface (API) to read the second authentication information stored in the global variable. The kernel sends the second authentication information, and the authentication processing unit 140 conducts the authentication of the wireless network apparatus 100 based on the second authentication information sent from the kernel. If the authentication processing unit 140 uses the first authentication information when the authentication of the wireless network apparatus 100 is conducted, the authentication processing unit 140 may use the second authentication information sent from the kernel after converting it via the authentication information converting unit 120.

The interface unit 160 may be a wired interface based on, for example, USB or IEEE 1394, or a wireless interface based on, for example, Bluetooth. When an external device needs the authentication of the wireless network apparatus 100 and the second authentication information, the interface unit 160 may use the second authentication information stored in the nonvolatile storage unit 130 without powering on the wireless network apparatus 100. Because information such as the MAC address may be used without powering on the wireless network apparatus 100, it is possible to reduce the power consumption of the wireless network apparatus.

Hereinafter, a method for authenticating a wireless network apparatus according to an exemplary embodiment of the present invention will be described in detail.

Figure 4:
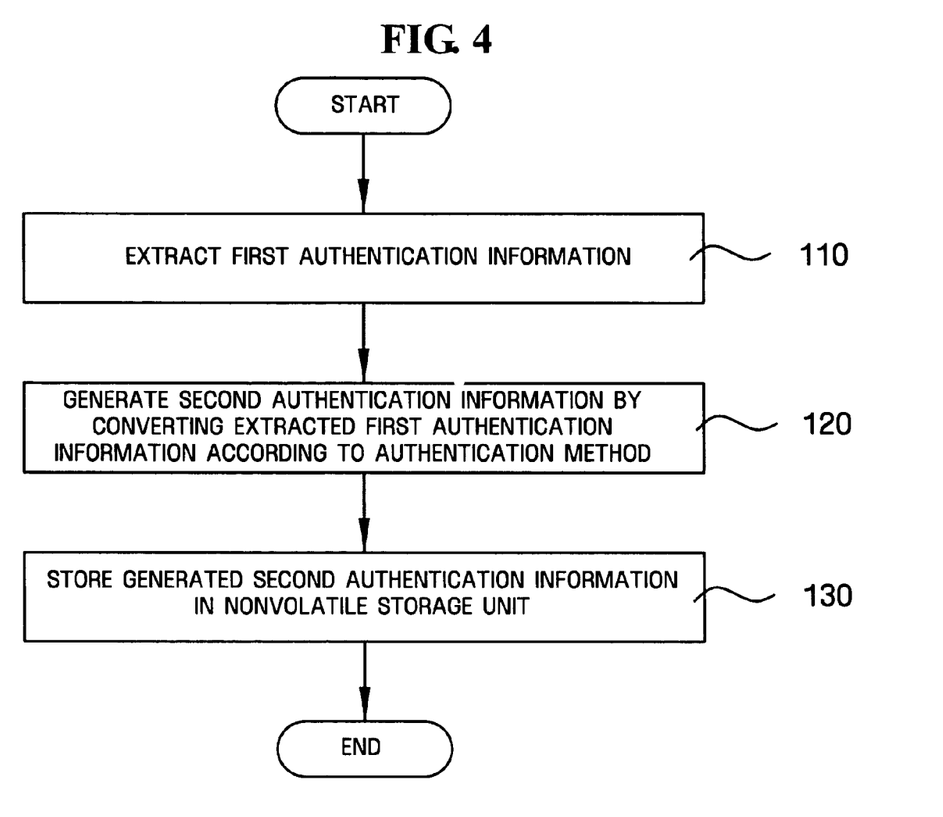
FIG. 4 illustrates the generation of a second authentication information according to an exemplary embodiment of the present invention.

FIG. 4 illustrates a method for generating second authentication information according to an exemplary embodiment of the present invention. As shown in FIG. 4, the method for generating second authentication information allows the authentication information extracting unit 150 to extract first authentication information stored in the authentication information storage unit 110 at a request of a user request 110.

In operation 120, the authentication information converting unit 120 generates second authentication information by converting the first authentication information extracted according to the authentication method of the wireless network apparatus 100. Because the MAC address used in an exemplary embodiment of the present invention is composed of 48 bits, the MAC address cannot be used in a digital multimedia management system that uses 128 bits. Accordingly, the authentication information converting unit 120 may generate the second authentication information from the first authentication information by adding a predetermined series of bits such as a string to the extracted first authentication information.

Also, when a conduction of the authentication of the wireless network apparatus 100 using only the first authentication information is possible, the authentication information converting unit 120 does not convert the extracted first authentication information.

In operation 130, the nonvolatile storage unit 130 stores the second authentication information generated by the authentication information converting unit 120. Because the nonvolatile storage unit 130 is composed of nonvolatile memory cells, the second authentication information is retained even when the wireless network apparatus 100 powers off.

Because the generated second authentication information is stored in a secure area of the nonvolatile storage unit 130, such as a TRM, and external access is selectively allowed, security of the second authentication information can be ensured.

Figure 5:
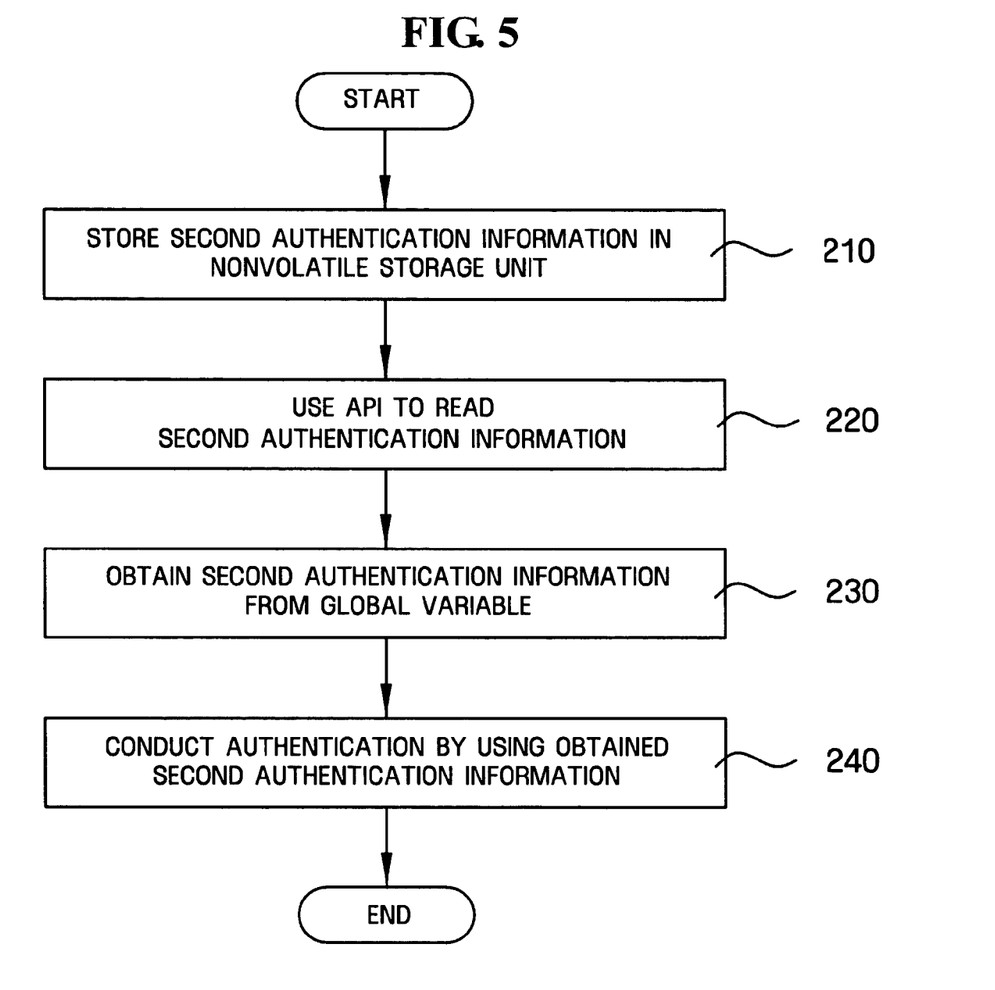
FIG. 5 illustrates the authentication of the wireless network apparatus conducted based on the second authentication information according to an exemplary embodiment of the present invention.

FIG. 5 illustrates a method for conducting an authentication of a wireless network apparatus by using second authentication information of FIG. 4. As shown in FIG. 5, if the wireless network apparatus 100 powers on, the authentication processing unit 140 reads the second authentication information stored in the nonvolatile storage unit 130 and then stores the second authentication information in a global variable in operation 210. The kernel, which an application cannot access, reads the second authentication information from the nonvolatile storage unit 130 and stores the second authentication information in a global variable.

In operation 220, the application uses the API to read the second authentication information. The kernel sends the second authentication information stored in the global variable in response to the application's call in operation 230. The application conducts the authentication of the wireless network apparatus 100 based on the second authentication information sent from the kernel in operation 240.

The second authentication information and the first authentication information may be similar or different. For example, if the authentication method of the wireless network apparatus 100 uses the number of bits of the first authentication information, the second authentication information may be identical with the first authentication information because the first authentication information is not additionally converted. If the authentication method of the wireless network apparatus 100 uses a different number of bits with than the number of bits of the first authentication information, the second authentication information may be different from the first authentication information because the first authentication information has been converted.

The second authentication information used in the authentication method of the wireless network apparatus may be used when the wireless network apparatus 100 is on or off. Because the second authentication information may be transmitted to an external device through a communication between the external device and the interface unit 160, the second authentication information stored in the nonvolatile storage unit 130 may be used by the interface unit 160 as well as the authentication of the wireless network apparatus 100. Further, because the wireless network apparatus and the authentication method of the same may use the second authentication information stored in the nonvolatile storage unit 130 in authentications and other situations without powering on the wireless network apparatus the need to power on the wireless network apparatus whenever the authentication is conducted is eliminated.

The "unit" indicates a software component or a hardware component such as a field-programmable gate array (FPGA) or an application-specific integrated circuit (ASIC). The module performs a particular function and may be included in an addressable storage medium or it may be configured to play one or more processors. Accordingly, modules may include components such as software components, object-oriented software components, class components, and task components, processes, functions, attributes, procedures, subroutines, segments of a program code, drivers, firmware, microcode, circuits, data, databases, data structures, tables, arrays, and parameters. Components and features provided by the modules may be combined into a smaller number of components and features, or they may be divided into a greater number of components and features.

As is described above, the wireless network apparatus and the authentication according to example embodiments of the present invention produce one or more of the effects described below.

A wireless network apparatus stores authentication information, which is required for network communication, in a nonvolatile area, and authentication may be conducted even when a user does not power on the apparatus, thereby being capable of increasing the apparatus's efficiency.

Authentication information stored in a nonvolatile area of the wireless network apparatus may be transmitted to an external device via a predetermined interface, and the apparatus does not need to be powered on to do so, thereby being capable of reducing power consumption.

Various components of the wireless network apparatus 100, as shown in FIG. 3, including, for example, an authentication information converting unit 120, an authentication processing unit 140, and an authentication information extracting unit 150, can be implemented in software or hardware, such as, for example, an application specific integrated circuit (ASIC) or printed circuit board (PCB). As such, it is intended that the processes described herein be broadly interpreted as being equivalently performed by software, hardware, or a combination thereof. Software modules can be written, via a variety of software languages, including C, C++, Java, Visual Basic, and many others. The various software modules may also be integrated in a single application executed on various types of wireless cards, such as PCMCIA cards, PCI cards, USB card. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

As described from the foregoing, the present invention advantageously provides a wireless network apparatus for performing authentication even when the apparatus is not turned on so as to reduce power consumption, while increasing efficiency.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the components of the wireless network apparatus 100, as shown in FIG. 3, including, for example, an authentication information converting unit 120, an authentication processing unit 140, and an authentication information extracting unit 150, can be implemented in a single hardware or firmware stalled at an existing wireless card to perform the functions as described. In addition, the present invention is applicable for use with all types of wireless communication devices and wireless networks, including, for example, wireless personal area networks (PANs), wireless local area networks (LANs) such as Wi-Fi networks, Bluetooth, ultra-wideband networks, and wireless metropolitan area networks (MANs) and compatible wireless application protocols usable for wireless transmission as specified by IEEE 802.11(a), (b) and/or (g) standards, Bluetooth standards, other emerging wireless technologies such as Wi-Max in which service coverage areas can be extended up to 30 miles, or even mobile cellular networks supporting a wide range of coverage. In addition, wireless network apparatuses 14A-14N can also be mobile stations, such as phones or personal digital assistants (PDAs). Furthermore, alternative embodiments of the invention can be implemented as a computer program product for use with a computer system. Such a computer program product can be, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device. Furthermore, both the software modules as described in connection with FIGS. 8-11 can also be machine-readable storage media, such as dynamic or static random access memories (DRAMs or SRAMs), erasable and programmable read-only memories (EPROMs), electrically erasable and programmable read-only memories (EEPROMS) and flash memories; magnetic disks such as fixed, floppy and removable disks; other magnetic media including tape; and optical media such as compact discs (CDs) or digital video discs (DVDs). Accordingly, it is intended, therefore, that the present invention not be limited to the various example embodiments disclosed, but that the present invention includes all embodiments falling within the scope of the appended claims.

What is claimed is:

1. A wireless network apparatus, comprising:
an authentication information storage unit to store first authentication information of the wireless network apparatus to allow for network communication of the wireless network apparatus;
an authentication information converting unit to generate second authentication information of the wireless network apparatus by converting the first authentication information of the wireless network apparatus according to a predetermined authentication method that includes adding a predetermined string to the first authentication information to obtain the second authentication information; and
an authentication processing unit to conduct an authentication based on the first authentication information and to store the second authentication information in a second authentication information storage unit when the wireless network apparatus is powered on and to conduct the authentication based on the second authentication information when the wireless network apparatus is powered off.

2. The apparatus according to claim 1, further comprising:
an authentication information extracting unit to extract the first authentication information stored in the authentication information storage unit at a request of a user; and
an interface unit to allow the authentication information storage unit and an external device to communicate with each other.

3. The apparatus according to claim 2, wherein the interface unit uses a Universal Serial Bus (USB), Fire Wire (IEEE 1394), and/or Bluetooth.

4. The apparatus according to claim 1, wherein the first authentication information is a Media Access Control (MAC) address.

5. The apparatus according to claim 1, wherein the authentication information converting unit compares the number of bits used in the authentication and the number of bits of the first authentication information, and, when the number of bits are different, adds the predetermined string to the first authentication information so that the first authentication information has the necessary number of bits for the authentication.

6. The apparatus according to claim 1, wherein the second authentication information storage unit includes a tamper resistant module (TRM) area and stores the second authentication information in the TRM area.

7. An authentication method of a wireless network apparatus, the method comprising:

generating second authentication information of the wireless network apparatus by converting first authentication information of the wireless network apparatus to allow for network communication according to a predetermined authentication method that includes adding a predetermined string to the first authentication information to obtain the second authentication information; and conducting an authentication based on the first authentication information and storing of the generated second authentication information in a second authentication information storage unit of the wireless network apparatus when the wireless network apparatus is powered on and conducting the authentication based on the second authentication information when the wireless network apparatus is powered off.

8. The method according to claim 7, wherein the first authentication information is a Media Access Control (MAC) address.

9. The method according to claim 7, wherein the generating comprises:

comparing the number of bits used in the authentication method and the number of bits of the first authentication information; and when the number of bits are different, adding the predetermined string to the first authentication information to convert the first authentication information to the required number of bits for the authentication.

10. The method according to claim 7, wherein the storing comprises storing the second authentication information in the tamper resistant module (TRM) area.

11. The method according to claim 7, wherein the second authentication information stored in the second authentication information storage unit is transmitted via at least one of a USB, IEEE 1394, and Bluetooth interfaces.

12. A non-transitory computer readable medium to execute the method according to claim 7.

13. A wireless network apparatus, for use with a network in which stored first authentication information of the wireless network apparatus allows for network communication, the wireless network apparatus comprising:

an authentication information converting unit to generate second authentication information of the wireless network apparatus by converting the stored first authentication information of the wireless network apparatus according to a predetermined authentication method that includes adding a predetermined string to the first authentication information to obtain the second authentication information, wherein the conversion of the first authentication information by the authentication information converting unit is omitted if authentication is possible using the first authentication information; and an authentication processing unit to conduct an authentication based on the first authentication information and to store the second authentication information in a second authentication information storage unit when the wireless network apparatus is powered on and to conduct the authentication based on the second authentication information when the wireless network apparatus is powered off.

14. The apparatus according to claim 13, further comprising an authentication information extracting unit to extract the stored first authentication information upon request.

15. The apparatus according to claim 13, further comprising an interface unit to allow the second authentication information storage unit and an external device to communicate with each other.

16. The apparatus according to claim 13, wherein the first authentication information is a Media Access Control (MAC) address.

17. The apparatus according to claim 13, wherein the authentication information converting unit compares the number of bits used in the authentication and the number of bits of the first authentication information, and, when the number of bits are different, adds the predetermined string to the first authentication information so that the first authentication information has the necessary number of bits for the authentication.

18. The apparatus according to claim 13, wherein the second authentication information storage unit includes a tamper resistant module (TRM) area, and stores the second authentication information in the TRM area.

19. A method of generating second authentication information to conduct an authentication of a wireless network apparatus, the method comprising:

allowing access based on a stored first authentication information of the wireless network apparatus upon request when the wireless network apparatus is powered on;

generating second authentication information of the wireless network apparatus from the first authentication information by adding a predetermined string to the first authentication information to obtain the second authentication information;

storing the second authentication information in a second authentication information storage unit and retaining the second authentication information in the wireless network apparatus when the wireless network apparatus is powered on;

when the wireless network apparatus is powered off, conducting an authentication based on the second authentication information and storing the second authentication information in a global variable; and reading the second authentication information according to a predetermined application.

20. The method according to claim 19, wherein, when conducting the authentication of the wireless network apparatus using only the first authentication information is possible, the converting of the extracted first authentication information is skipped.

* * * * *